US009408406B2

(12) United States Patent
Dierbach et al.

(10) Patent No.: US 9,408,406 B2
(45) Date of Patent: Aug. 9, 2016

(54) FOOD AND BEVERAGE PRODUCTS CONTAINING 1,3-PROPANEDIOL AND METHODS OF SUPPRESSING BITTERNESS AND ENHANCING SWEETNESS IN FOOD AND BEVERAGE PRODUCTS USING 1,3-PROPANEDIOL

(71) Applicant: Kraft Foods Group Brands LLC, Northfield, IL (US)

(72) Inventors: Lisa Ann Dierbach, Arlington Heights, IL (US); John B. Topinka, Evanston, IL (US); Deborah D. Barber, Hoffman Estates, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 521 days.

(21) Appl. No.: 13/791,340

(22) Filed: Mar. 8, 2013

(65) Prior Publication Data
US 2013/0236597 A1    Sep. 12, 2013

Related U.S. Application Data

(60) Provisional application No. 61/704,054, filed on Sep. 21, 2012, provisional application No. 61/609,044, filed on Mar. 9, 2012.

(51) Int. Cl.
*A23L 1/22* (2006.01)
*A23G 4/06* (2006.01)
*A23L 2/56* (2006.01)
*A23G 3/36* (2006.01)

(52) U.S. Cl.
CPC ... *A23L 1/22* (2013.01); *A23G 3/36* (2013.01); *A23G 4/06* (2013.01); *A23L 1/22083* (2013.01); *A23L 2/56* (2013.01)

(58) Field of Classification Search
CPC .............................. A23L 1/22083; A23L 2/56
See application file for complete search history.

(56) References Cited

U.S. PATENT DOCUMENTS

| | | |
|---|---|---|
| 3,904,774 A | 9/1975 | Dymsza |
| 3,966,986 A | 6/1976 | Hunter |
| 3,981,774 A | 9/1976 | Hitzman |
| 3,992,147 A | 11/1976 | Christian |
| 4,058,621 A | 11/1977 | Hill |
| 4,123,589 A | 10/1978 | Korlatzki |
| 4,155,770 A | 5/1979 | Doumani |
| 4,156,742 A | 5/1979 | Babcock |
| 4,206,243 A | 6/1980 | Schlingmann |
| 4,234,613 A | 11/1980 | Lewis |
| 4,259,359 A | 3/1981 | Spicer |
| 4,400,390 A | 8/1983 | Pittet |
| 4,404,184 A | 9/1983 | Pittet |
| 4,439,525 A | 3/1984 | Shay |
| 4,446,161 A | 5/1984 | Friedman |
| 4,465,702 A | 8/1984 | Eastman |
| 4,517,120 A | 5/1985 | Roychoudhury |
| 4,540,590 A | 9/1985 | Harada |
| 4,601,986 A | 7/1986 | Wegner |
| 4,774,095 A | 9/1988 | Kleinschmidt |
| 4,794,006 A | 12/1988 | Boni |
| 4,906,487 A | 3/1990 | Delmas |
| 4,997,976 A | 3/1991 | Brunengraber |
| 5,023,102 A | 6/1991 | Given, Jr. |
| 5,225,219 A | 7/1993 | Inglett |
| 5,254,673 A | 10/1993 | Cook |
| 5,286,512 A | 2/1994 | Klemann |
| 5,512,313 A | 4/1996 | Cooper |
| 5,531,982 A * | 7/1996 | Gaffar et al. ............... 424/49 |
| 5,580,491 A | 12/1996 | Phillips |
| 5,681,505 A | 10/1997 | Phillips |
| 5,851,578 A * | 12/1998 | Gandhi ..................... 426/590 |
| 5,922,379 A | 7/1999 | Wang |
| 5,989,526 A * | 11/1999 | Aaslyng et al. ............. 424/50 |
| 6,017,573 A | 1/2000 | Baker |
| 6,162,475 A | 12/2000 | Hagenmaier |
| 6,183,794 B1 | 2/2001 | Kaesler |
| 6,660,311 B2 | 12/2003 | Goedeken |
| 6,709,691 B2 | 3/2004 | Skiff |
| 6,749,879 B2 * | 6/2004 | Broz .......................... 426/565 |

(Continued)

FOREIGN PATENT DOCUMENTS

| | | |
|---|---|---|
| CN | 101035443 | 9/2007 |
| CN | 101516966 | 8/2009 |

(Continued)

OTHER PUBLICATIONS

Burdock, George A., "Fenaroli's Handbook of Flavor Ingredients." Fifth Edition, 2005, 810, pp. 27-28.
DiStefano, R., et al., "Principal Parameters of Grape Ripening and Wine Fermentation." In Hyphenated Techniques in Grape and Wine Chemistry, 2008, p. 20.
International Patent Application No. PCT/US2013/029801, International Search Report and Written Opinion, dated Sep. 9, 2014, 10 pages.
Jiang, Bao., et al., "Volatile Compounds of Young Wines from Cabernet Sauvignon, Cabernet Gernischet and Chardonnay Varieties Grown in the Loess Plateau Region of China." Molecules, 2010, vol. 15, pp. 9184-9196.

(Continued)

*Primary Examiner* — Nikki H Dees
(74) *Attorney, Agent, or Firm* — Fitch, Even, Tabin & Flannery LLP (57) ABSTRACT

Food or beverages prepared using 1,3-propanediol have shown to have modified flavor profiles, including bitterness suppression of high intensity sweeteners and potassium chloride, relative to comparable food or beverages that do not include 1,3-propanediol. Inclusion of 1,3-propanediol uniquely modifies the flavor profile of food products or food ingredients even when 1,3-propanediol is included in such low amounts that it does not itself contribute flavor to the product. 1,3-propanediol may be included in the food or beverage products in certain amounts to effect this bitterness suppression or in specific ratios relative to one or more high intensity sweeteners or potassium chloride.

13 Claims, 4 Drawing Sheets

(56) References Cited

U.S. PATENT DOCUMENTS

| | | |
|---|---|---|
| 6,818,243 B2 | 11/2004 | Nagashima |
| 7,014,876 B2 | 3/2006 | Iwasaki |
| 7,144,592 B2 | 12/2006 | Rader |
| 7,261,769 B2 | 8/2007 | Bhaskaran |
| 7,455,872 B2 | 11/2008 | Salemme |
| 7,455,997 B2 | 11/2008 | Hughes |
| 7,582,215 B2 | 9/2009 | Hughes |
| 7,608,191 B2 | 10/2009 | Hughes |
| 7,638,155 B2 | 12/2009 | Irwin |
| 7,744,944 B2 | 6/2010 | Binder |
| 7,842,320 B2 | 11/2010 | Baydo |
| 7,867,400 B2 | 1/2011 | Hughes |
| 8,067,193 B2 | 11/2011 | Hughes |
| 2001/0018085 A1 | 8/2001 | Coutandin |
| 2003/0021883 A1 | 1/2003 | Skiff |
| 2004/0036752 A1 | 2/2004 | Botros |
| 2006/0088627 A1 | 4/2006 | Bartnick |
| 2006/0188548 A1* | 8/2006 | Mattson et al. ............ 424/439 |
| 2006/0193960 A1 | 8/2006 | Wilson |
| 2006/0286276 A1 | 12/2006 | Salemme |
| 2007/0241306 A1 | 10/2007 | Wehner |
| 2007/0275139 A1* | 11/2007 | Joerger et al. ............ 426/321 |
| 2008/0058410 A1 | 3/2008 | Kim |
| 2008/0176957 A1 | 7/2008 | Joerger |
| 2008/0260900 A1 | 10/2008 | Wittorff |
| 2009/0035426 A1 | 2/2009 | Verrall |
| 2009/0053385 A1 | 2/2009 | Fry |
| 2009/0110798 A1 | 4/2009 | Gusek |
| 2009/0117226 A1 | 5/2009 | Hallberg |
| 2009/0155446 A1 | 6/2009 | Reiss |
| 2009/0162488 A1 | 6/2009 | Bell |
| 2009/0246330 A1 | 10/2009 | Zhong |
| 2009/0263556 A1 | 10/2009 | Blondeel |
| 2009/0297665 A1 | 12/2009 | Bromley |
| 2009/0311368 A1 | 12/2009 | Wittorff |
| 2010/0034925 A1 | 2/2010 | Pibarot |
| 2010/0069510 A1 | 3/2010 | Schafer |
| 2010/0130422 A1 | 5/2010 | Bernaert |
| 2010/0189845 A1 | 7/2010 | Grover |
| 2010/0323066 A1 | 12/2010 | Comstock |
| 2011/0151051 A1 | 6/2011 | Neergaard |
| 2011/0206802 A1 | 8/2011 | Flynn |
| 2011/0230343 A1 | 9/2011 | Schroers |
| 2011/0293789 A1 | 12/2011 | Blondeel |
| 2012/0027890 A1 | 2/2012 | Cerne |
| 2012/0107477 A1 | 5/2012 | Siegel |
| 2013/0236620 A1 | 9/2013 | Herrera-Gomez |
| 2013/0295259 A1 | 11/2013 | Dierbach |

FOREIGN PATENT DOCUMENTS

| | | |
|---|---|---|
| CN | 101816420 | 9/2010 |
| JP | 2011073979 | 4/2011 |
| WO | 2005102071 | 11/2005 |
| WO | 2010141889 | 9/2010 |
| WO | 2013134532 | 9/2013 |
| WO | 2013134607 | 9/2013 |

OTHER PUBLICATIONS

Kawai, Shigeru., et al., "Identification of New Constituents of Cider Vinegar by 13C-NMR Spectroscopic Study." Agriculture Biology Chemistry, vol. 55, No. 10, 1991, pp. 2633-2635.

Ran, Huasong, et al., "The Utility and Market of 1,3-Propanial." Guangdong Chemical Industry, Oct. 2006, vol. 33, No. 162, pp. 29-32 and 36, with English Abstract.

* cited by examiner

FOOD AND BEVERAGE PRODUCTS CONTAINING 1,3-PROPANEDIOL AND METHODS OF SUPPRESSING BITTERNESS AND ENHANCING SWEETNESS IN FOOD AND BEVERAGE PRODUCTS USING 1,3-PROPANEDIOL

CROSS REFERENCE TO RELATED APPLICATIONS

This application claims the benefit of U.S. Provisional Application No. 61/704,054, filed Sep. 21, 2012, and U.S. Provisional Application No. 61/609,044, filed Mar. 9, 2012, both of which are incorporated herein by reference in their entireties.

FIELD

This application is directed to modification of flavor profiles, flavor perception, and/or flavor release. More specifically, this application is directed to the use of 1,3-propanediol for suppressing bitterness and enhancing sweetness in food or beverage products.

BACKGROUND

There is increasing consumer demand for healthy foods and healthy ingredients. Consumers demand products having improved nutrition, including, for instance, fewer calories, lower fat content, and reduced sodium. This demand comes with a corresponding demand that the healthier foods and beverages have a taste and texture comparable to the food products they are formulated to replace. Consumers also desire the convenience associated with the original products, including pre-packaged snack foods and products with easy preparation.

High intensity sweeteners are often included in products to reduce the amount of nutritive (i.e., caloric) sweeteners, such as sucrose, dextrose, fructose, corn syrup, or high fructose corn syrup. Inclusion of high intensity sweeteners can significantly reduce the caloric content of the food or beverage products. High intensity sweeteners can be included in relatively small amounts while contributing the sweetness of a much larger content of nutritive sweeteners. A variety of high intensity sweeteners are used in food and beverage products, including, for example, stevia, acesulfame potassium, aspartame, saccharin, cyclamates, sucralose, alitame, saccharin, neohesperidin dihydrochalcone, cyclamate, neotame, N—[N-[3-(3-hydroxy-4-methoxyphenyl)propyl]-L-a-aspartyl]-10 phenylalanine 1-methyl ester, N—[N-[3-(3-hydroxy-4-methoxyphenyl)-3-methylbutyl]-L-aaspartyl]-L-phenylalanine 1-methyl ester, N—[N-[3-(3-methoxy-4-hydroxyphenyl)propyl]L-a-aspartyl]-L-phenylalanine 1-methyl ester, and salts thereof, and steviol glycoside sweeteners, such as rebaudioside A, rebaudioside B, rebaudioside C, rebaudioside D, rebaudioside E, rebaudioside F, dulcoside A, dulcoside B, rubusoside, stevia, stevioside, and steviolbioside. The non-nutritive sweeteners have varying sweetening power relative to sucrose. High intensity sweeteners can be categorized as either artificial or chemically synthesized sweeteners (e.g., acesulfame potassium, aspartame, sucralose) or natural high intensity sweeteners extracted from natural sources (e.g., extracts from Stevia rebaudian or luo han guo fruit).

High intensity sweeteners are widely used in products such as diet soft drinks, chewing gum, beverage concentrates, and other "sugar-free" products but the wide scale use of high intensity sweeteners has been limited, at least in part, due to consumers perceiving many of them, both those considered natural and artificial, as contributing undesirable bitterness to the food and beverage products in which they are used. The high intensity sweeteners most criticized for contributing undesirable bitterness are stevia, aspartame, Neotame®, acesulfame potassium, saccharin, and other peptide-based high intensity sweeteners.

There has also been a push to decrease the sodium content of various food products. While sodium chloride can simply be removed from food products, there is consumer resistance to this approach and there is consumer demand for food products that lack sodium while still having a similar salty taste characteristic of foods containing sodium chloride. A variety of salt substitutes are marketed today, including, for example, potassium chloride, potassium lactate, or reduced-sodium salts. However, certain salts are perceived by a number of consumers as contributing bitterness to food and beverage products. For example, a subset of consumers perceives potassium chloride (KCl) as being bitter and having an unpleasant aftertaste. While KCl has been considered a possible replacement for sodium chloride when seeking to reduce the sodium content of food products, KCl has had limited usefulness in food products because many consumers perceive KCl as being bitter.

It would be desirable to meet the consumer demand for food and beverage products that include substitutes for sodium chloride and nutritive sweeteners while providing products with a taste similar or better than those including sodium chloride and nutritive sweeteners.

SUMMARY 1,3-propanediol has been promoted for use in personal care formulations and cosmetics but is not known to be commonly used in the food industry. 1,3-propanediol is a polar compound that can be prepared from corn sugar. 1,3-propanediol may be used in food and beverage products to modify the bitters profile compared to an otherwise identical food or beverage product which does not contain 1,3-propanediol. It was surprisingly and unexpectedly found that inclusion of 1,3-propanediol in food and beverage products in very small quantities is able to suppress bitterness of certain ingredients in food and beverage products. In one aspect, 1,3-propanediol is effective to reduce bitterness associated with high intensity sweeteners in food and beverage products. In one particularly preferred aspect, the high intensity sweetener comprises one or more steviol glycosides. In another aspect, 1,3-propanediol is effective to reduce bitterness associated with salt substitutes, such as potassium chloride, in food and beverage products.

Generally, 1,3-propanediol is included in the food or beverage product in an amount such that 1,3-propanediol does not itself provide flavor to the food or beverage and is not perceived through taste as being included in the product. For example, 1,3-propanediol is included in an amount generally considered to be below the organoleptically perceptible flavor threshold for the average consumer. In other words, a comparative product containing no 1,3-propanediol is not perceptibly different in taste than a product containing 1,3-propanediol. The amount of 1,3-propanediol can also be determined by dilution in water, if desired, to ensure that the 1,3-propanediol does not provide flavor to the food or beverage.

It was surprisingly and unexpectedly found that including a very small quantity of 1,3-propanediol as described herein is effective to reduce bitterness in a food or beverage product including a high intensity sweetener. It was further discovered that inclusion of 1,3-propanediol in an amount effective to reduce the bitterness provided by a high intensity sweetener also advantageously increased the perception of sweetness provided by the high intensity sweetener.

By one approach, a food or beverage product is provided comprising an amount of 1,3-propanediol effective to substantially reduce the bitterness provided by a high intensity sweetener in the food or beverage product. In one aspect, the food or beverage product comprises about 0.0001 to about 0.006 percent 1,3-propanediol, in another aspect about 0.0001 to about 0.0019 weight percent 1,3-propanediol, and in yet another aspect about 0.0005 to about 0.0019 weight percent 1,3-propanediol.

By another approach, a food or beverage product is provided comprising 1,3-propanediol and a high intensity sweetener in a ratio effective for the 1,3-propanediol to substantially reduce the bitterness provided by the high intensity sweetener in the food or beverage product. In one aspect, a food or beverage product is provided comprising a ratio of 1,3-propanediol to high intensity sweetener of about 0.01:8 to about 0.6:8, in another aspect about 0.01:5 to about 0.6:5, and in another aspect about 1:5 to about 2:5.

By another approach, a method is provided for reducing bitterness of a high intensity sweetener in a food or beverage product, the method comprises adding an amount of 1,3-propanediol effective to substantially reduce the bitterness provided by the high intensity sweetener in the food or beverage product. In one aspect, the method comprises adding about 0.0001 to about 0.006 percent 1,3-propanediol, in another aspect about 0.0001 to about 0.0019 weight percent 1,3-propanediol, and in yet another aspect about 0.0005 to about 0.0019 weight percent 1,3-propanediol to the food or beverage product comprising the high intensity sweetener.

By yet another approach, a method is provided for reducing bitterness of a high intensity sweetener in a food or beverage product, the method comprises adding 1,3-propanediol and a high intensity sweetener in a ratio effective for the 1,3-propanediol to substantially reduce the bitterness provided by the high intensity sweetener in the food or beverage product. In one aspect, the method comprises adding 1,3-propanediol and high intensity sweetener in a ratio of 1,3-propanediol to high intensity sweetener of about 0.01:8 to about 0.6:8, in another aspect about 0.01:5 to about 0.6:5, and in another aspect about 1:5 to about 2:5.

By one approach, a food or beverage product is provided comprising an amount of 1,3-propanediol effective to substantially reduce the bitterness provided by KCl in the food or beverage product. In one aspect, the food or beverage product comprises about 0.0002 to about 0.003 percent 1,3-propanediol, in another aspect about 0.0005 to about 0.003 weight percent 1,3-propanediol, and in yet another aspect about 0.0005 to about 0.002 weight percent 1,3-propanediol and also comprises KCl. In one aspect, the food or beverage product includes about 0.01 to about 20 percent KCl, in another aspect about 0.1 to about 15 percent KCl, and in yet another aspect about 0.5 to about 10 percent KCl.

By another approach, a food or beverage product is provided comprising 1,3-propanediol and KCl in a ratio effective for the 1,3-propanediol to substantially reduce the bitterness provided by the KCl in the food or beverage product. In one aspect, a food or beverage product is provided comprising a ratio of 1,3-propanediol to KCl of about 0.000025:1 to about 1:1, in another aspect about 0.00025:1 to about 0.5:1, and in another aspect about 0.025:1 to about 0.1:1.

By another approach, a method is provided for reducing bitterness of KCl in a food or beverage product, the method comprises adding an amount of 1,3-propanediol effective to substantially reduce the bitterness provided by the KCl in the food or beverage product. In one aspect, the method comprises adding about 0.0002 to about 0.003 percent 1,3-propanediol, in another aspect about 0.0005 to about 0.003 weight percent 1,3-propanediol, and in yet another aspect about 0.0005 to about 0.002 weight percent 1,3-propanediol to the food or beverage product comprising KCl. In one aspect, the food or beverage product includes about 0.01 to about 20 percent KCl, in another aspect about 0.1 to about 15 percent KCl, and in yet another aspect about 0.5 to about 10 percent KCl.

By yet another approach, a method is provided for reducing bitterness of KCl in a food or beverage product, the method comprises adding 1,3-propanediol and KCl in a ratio effective for the 1,3-propanediol to substantially reduce the bitterness provided by the KCl in the food or beverage product. In one aspect, the method comprises adding 1,3-propanediol and KCl in a ratio of 1,3-propanediol to KCl of about 0.000025:1 to about 1:1, in another aspect about 0.00025:1 to about 0.5:1, and in another aspect about 0.025:1 to about 0.1:1.

DETAILED DESCRIPTION

It was found that inclusion of 1,3-propanediol uniquely modifies the flavor profile of food or beverage products or ingredients in food or beverage products. This unique effect was found even when 1,3-propanediol is included in such low amounts (e.g., about 0.0001 to about 0.006 percent by weight of the food or beverage product) that it does not itself contribute flavor to the product. When included in such low amounts, the modified flavor profile is not provided by masking flavor of the product. In this respect, 1,3-propanediol functions in the beverage and food products as a flavor adjuvant, by which is meant that the 1,3-propanediol affects the flavor or perception of flavor in the food product while not acting as a flavoring ingredient itself. In one aspect, inclusion of 1,3-propanediol is effective to suppress bitterness contributed by one or more other ingredients in the food or beverage product. In yet another aspect, inclusion of 1,3-propanediol is effective to enhance sweetness contributed by one or more other ingredients in the food or beverage product.

Generally, 1,3-propanediol is included in the food or beverage product in an amount such that 1,3-propanediol does not itself provide flavor to the food or beverage and is not perceived through taste as being included in the product. 1,3-propanediol is commercially sold as ZEMEA® from DuPont Tate & Lyle BioProducts (Wilmington, Del.) but other sources of 1,3-propanediol may also be used. For example, 1,3-propanediol is included in an amount generally considered to be below the organoleptically perceptible flavor threshold for the average consumer. In other words, a comparative product containing no 1,3-propanediol is not perceptibly different in taste than a product containing 1,3-propanediol. The amount of 1,3-propanediol can also be determined by dilution in water, if desired, to ensure that the 1,3-propanediol does not provide flavor to the food or beverage.

When used in beverage concentrates or other products intended to be diluted or otherwise combined with additional ingredients prior to preparing a final product in consumable form, 1,3-propanediol can be used in an amount greater than the organoleptically perceptible flavor threshold but the concentrated product should be formulated to provide an amount less than the organoleptically perceptible flavor threshold in the final product after dilution by the prescribed amount.

Use with High Intensity Sweeteners

High intensity sweeteners are often perceived as contributing undesirable bitterness to the food and beverage products in which they are included. As used herein, the term "high intensity sweetener" refers to compositions, including compounds or extracts, having substantially greater sweetening power relative to sucrose. In one aspect, the high intensity sweetener has a sweetening power of at least about 100 times that of sucrose. High intensity sweeteners include, for example, sucralose, aspartame, saccharine, monatin, luo han guo, peptide-based high intensity sweeteners (e.g., Neotame®), cyclamates (such as sodium cyclamate), Luo Han Guo, acesulfame potassium, alitame, saccharin, neohesperidin dihydrochalcone, cyclamate, N—[N-[3-(3-hydroxy-4-methoxyphenyl)propyl]-L-a-aspartyl]-L-10 phenylalanine 1-methyl ester, N—[N-[3-(3-hydroxy-4-methoxyphenyl)-3-methylbutyl]-L-aaspartyl]-L-phenylalanine 1-methyl ester, N—[N-[3-(3-methoxy-4-hydroxyphenyl)propyl]L-a-aspartyl]-L-phenylalanine 1-methyl ester, salts thereof, *stevia*, steviol glycosides, such as rebaudioside A (often referred to as "Reb A"), rebaudioside B, rebaudioside C, rebaudioside D, rebaudioside E, rebaudioside F, rebaudioside A, rebaudioside B, rebaudioside C, rebaudioside D, rebaudioside E, rebaudioside F, dulcoside A, dulcoside B, rubusoside, stevioside, and steviolbioside, and combinations thereof. The high intensity sweeteners may be included in the beverage or food products in the form of granules, powder, powdered leaf, or liquid.

*Stevia* is a natural sweetener that is known to have a lingering sweetness, bitterness and astringency when consumed. *Stevia* is the name generally given to extracts from plants from the genus *Stevia*. The extracts include one or more steviol glycosides and are refined to varying degrees. Reb A, for instance, is one of the major steviol glycosides isolated from *stevia* leaves. While Reb A is thought to be the most sweet and least bitter of the steviol glycosides, Reb A still contributes some bitterness when included in food and beverage products. Other *stevia* extracts contribute varying degrees of bitterness to food and beverage products. Generally, high intensity sweeteners prepared from plant extracts increase in cost according to the purity of the extract. It has been reported that extracts at <80 percent purity are available at moderate costs while extracts of greater purity are available at higher costs. The level of purity of the extract is not believed to be directly correlated with the level of bitterness provided by the extract. Despite its purity, an extract of high purity may be characterized by flavor defects, including bitterness. Extracts of high purity may be desirable for certain applications, such as in beverages, because higher purity is generally associated with less crystallization. Therefore, reduction of bitterness associated with higher purity extracts can allow for increased usage levels of the extract without the accompanying flavor defects.

It was surprisingly and unexpectedly found that including a very small quantity of 1,3-propanediol as described herein is effective to reduce bitterness in a food or beverage product including a high intensity sweetener. It was further discovered that inclusion of 1,3-propanediol in an amount effective to reduce the bitterness provided by a high intensity sweetener also advantageously increased the perception of sweetness provided by the high intensity sweetener. Advantageously, this would allow for reducing the usage level of the high intensity sweetener, thereby reducing any other off characteristics of the high intensity sweetener. In another aspect, use of 1,3-propanediol would also allow for increasing the maximum sweetness threshold of the high intensity sweetener. Most natural high intensity sweeteners have a maximum sweetness threshold, often about 7 brix, even with increasing usage levels. Inclusion of 1,3-propanediol with natural high intensity sweeteners therefore can advantageously allow for the sweetness threshold of the natural high intensity sweetener to be increased, such as beyond 9 brix for *stevia*, thereby allowing products of greater sweetness to be prepared or allowing products with lesser amounts of high intensity sweeteners to be prepared while contributing the same level of sweetness.

The amount of high intensity sweetener included in a given food or beverage product depends on the desired level of sweetness in the product, the sweetness of the high intensity sweetener relative to sucrose, and any other off flavor characteristics contributed by the high intensity sweetener. One degree Brix corresponds to 1 gram of sucrose in 100 grams of aqueous solution. One or more sweeteners, nutritive or high intensity, can be included in the food or beverage in an amount effective to provide the product with a level of sweetness equivalent to the desired degrees brix relative to sucrose. Generally, the high intensity sweetener is included in an amount effective to provide the desired sweetness in the food or beverage product. For example, a typical finished beverage ranges from 5-20 brix sucrose. When using high intensity sweeteners, brix equivalence can be reached with a usage level of about 0.001 to about 0.07 percent sweetener. For example *stevia* may be use at a range of about 0.01 to about 0.07 percent but generally not in an amount greater than about 0.03 percent due to the lack of increase sweetness at greater than 9 brix equivalence. In another example, thaumatin may be used at a range of about 0.001 to about 0.007 percent.

In any of the approaches described herein, the high intensity sweetener include any high intensity sweetener that provides a bitter flavor in food or beverage products, such as, for example, aspartame, Neotame®, N—[N-[3-(3-hydroxy-4-methoxyphenyl)propyl]-L-a-aspartyl]-L-10 phenylalanine 1-methyl ester, N—[N-[3-(3-hydroxy-4-methoxyphenyl)-3-methylbutyl]-L-aaspartyl]-L-phenylalanine 1-methyl ester, N—[N-[3-(3-methoxy-4-hydroxyphenyl)propyl]L-a-aspartyl]-L-phenylalanine 1-methyl ester, acesulfame potassium, saccharin, steviol glycosides, such as rebaudioside A (often referred to as "Reb A"), rebaudioside B, rebaudioside C, rebaudioside D, rebaudioside E, rebaudioside F, rebaudioside A, rebaudioside B, rebaudioside C, rebaudioside D, rebaudioside E, rebaudioside F, dulcoside A, dulcoside B, rubusoside, stevioside, and steviolbioside, or combinations thereof. In a particular aspect, the high intensity sweetener includes steviol glycosides which can be generally referred to as "*stevia*." For example, the high intensity sweetener may include one or more of steviol glycosides, such as rebaudioside A (often referred to as "Reb A"), rebaudioside B, rebaudioside C, rebaudioside D, rebaudioside E, rebaudioside F, rebaudioside A, rebaudioside B, rebaudioside C, rebaudioside D, rebaudioside E, rebaudioside F, dulcoside A, dulcoside B, rubusoside, stevioside, and steviolbioside. Steviol glycosides are the compounds from plants of the *Stevia* genus leaves responsible for imparting sweetness. In a more particular aspect, the high intensity sweetener includes steviol glycosides from *Stevia rebaudiana*.

By one approach, a food or beverage product is provided comprising an amount of 1,3-propanediol effective to substantially reduce the bitterness provided by a high intensity sweetener in the food or beverage product. In one aspect, the food or beverage product in final consumable form comprises about 0.0001 to about 0.006 percent 1,3-propanediol, in another aspect about 0.0001 to about 0.0019 weight percent 1,3-propanediol, and in another aspect about 0.0005 to about 0.0019 weight percent 1,3-propanediol. In one aspect, the food or beverage product comprises about 0.001 to about 0.07 percent high intensity sweetener. Generally, it has been found that bitterness is not suppressed outside the described ranges.

By another approach, a food or beverage product is provided comprising 1,3-propanediol and a high intensity sweetener in a ratio effective for the 1,3-propanediol to substantially reduce the bitterness provided by the high intensity sweetener in the food or beverage product. In one aspect, a food or beverage product is provided comprising a ratio of 1,3-propanediol to high intensity sweetener of about 0.01:8 to about 0.6:8, in another aspect about 0.01:5 to about 0.6:5, and in another aspect about 1:5 to about 2:5. Generally, it has been found that bitterness is not suppressed outside the described ranges.

By another approach, a method is provided for reducing bitterness of a high intensity sweetener in a food or beverage product, the method comprises adding an amount of 1,3-propanediol effective to substantially reduce the bitterness provided by the high intensity sweetener in the food or beverage product. In one aspect, the method comprises adding about 0.0005 to about 0.0019 percent 1,3-propanediol, in another aspect about 0.0001 to about 0.0019 percent 1,3-propanediol, in another aspect about 0.0005 to about 0.0019 weight percent 1,3-propanediol, and in yet another aspect about 0.0005 to about 0.006 weight percent 1,3-propanediol to the food or beverage product comprising the high intensity sweetener. In this respect, the food or beverage product is in final consumable form. In one aspect, the food or beverage product comprises about 0.001 to about 0.07 percent high intensity sweetener.

By yet another approach, a method is provided for reducing bitterness of a high intensity sweetener in a food or beverage product, the method comprises adding 1,3-propanediol and a high intensity sweetener in a ratio effective for the 1,3-propanediol to substantially reduce the bitterness provided by the high intensity sweetener in the food or beverage product. In one aspect, the method comprises adding 1,3-propanediol and high intensity sweetener in a ratio of 1,3-propanediol to high intensity sweetener of about 0.01:8 to about 0.6:8, in another aspect about 0.01:5 to about 0.6:5, and in another aspect about 1:5 to about 2:5.

The food or beverages including 1,3-propanediol may be prepared in a conventional manner, such as by mixing 1,3-propanediol with the remaining ingredients. It is not believed to be necessary that 1,3-propanediol be mixed with the high intensity sweetener prior to addition to food or beverage products. Instead, the 1,3-propanediol and high intensity sweetener can be added to the food or beverage products in any desired order.

A variety of food and beverage products can be prepared using 1,3-propanediol to reducing bitterness provided by high intensity sweeteners. For example, 1,3-propanediol may be used in products, such as, but not limited to, dairy products (e.g., coffee creamer, cream cheese, processed cheese, and the like), pasta, gelatin-based products, chewing gum, dessert (e.g., cheesecake, pudding, whipped topping), hard candy, condiments (e.g., dressing and sauce), beverages (e.g., coffee, tea, soda, and fruit juice), powdered beverages, and beverage concentrates. It should be appreciated that this is simply an exemplary listing of food and beverages and that 1,3-propanediol may be used in a variety of other food and beverage products.

In some aspects, the food or beverage may include an additional sweetener. Useful sweeteners may include both nutritive sweeteners, such as honey, fructose, sucrose, corn syrup, high fructose corn syrup, agave nectar, the like and high intensity sweeteners as described above, and combinations thereof.

Use with Potassium Chloride

Certain sodium chloride substitutes, such as KCl, are perceived by a subset of consumers as having a bitter or metallic taste. These consumers may be referred to as "KCl sensitive" consumers. These flavor defects have limited the widespread use of KCl as a salt substitute. However, it was surprisingly found that use of 1,3-propanediol with KCl reduced the bitterness associated with KCl and, also surprisingly, provided a sweet taste to some consumers, particularly those that are not KCl sensitive.

By any of the approaches described herein, the food or beverage may include about 0.01 to about 20 percent KCl, in another aspect about 0.1 to about 15 percent KCl, and in yet another aspect about 0.5 to about 10 percent KCl.

It was found that including a very small quantity of 1,3-propanediol as described herein is effective to reduce bitterness associated with inclusion of KCl in food or beverage products. The amount of KCl included in a given food or beverage product depends, at least in part, on the desired level of saltiness in the product. KCl is also often included as an electrolyte in sports beverages. KCl can also be used in food applications as a preservative.

By one approach, a food or beverage product is provided comprising an amount of 1,3-propanediol effective to substantially reduce the bitterness provided by KCl in the food or beverage product. In one aspect, a food or beverage product comprises about 0.0002 to about 0.003 percent 1,3-propanediol, in another aspect about 0.0005 to about 0.003 weight percent 1,3-propanediol, and in yet another aspect about 0.0005 to about 0.002 weight percent 1,3-propanediol and also comprises KCl. In one aspect, the food or beverage product includes about 0.01 to about 20 percent KCl, in another aspect about 0.1 to about 15 percent KCl, and in yet another aspect about 0.5 to about 10 percent KCl. Generally, it has been found that bitterness is not suppressed outside the described ranges.

By another approach, a food or beverage product is provided comprising 1,3-propanediol and KCl in a ratio effective for the 1,3-propanediol to substantially reduce the bitterness provided by the KCl in the food or beverage product. In one aspect, a food or beverage product is provided comprising a ratio of 1,3-propanediol to KCl of about 0.000025:1 to about 1:1, in another aspect about 0.00025:1 to about 0.5:1, and in another aspect about 0.025:1 to about 0.1:1. Generally, it has been found that bitterness is not suppressed outside the described ranges.

By another approach, a method is provided for reducing bitterness of KCl in a food or beverage product, the method comprises adding an amount of 1,3-propanediol effective to substantially reduce the bitterness provided by the KCl in the food or beverage product. In one aspect, the method comprises adding about 0.0002 to about 0.003 percent 1,3-propanediol, in another aspect about 0.0005 to about 0.003 weight percent 1,3-propanediol, and in yet another aspect about 0.0005 to about 0.002 weight percent 1,3-propanediol to the food or beverage product comprising KCl. In one aspect, the food or beverage product includes about 0.01 to about 20 percent KCl, in another aspect about 0.1 to about 15 percent KCl, and in yet another aspect about 0.5 to about 10 percent KCl.

By yet another approach, a method is provided for reducing bitterness of KCl in a food or beverage product, the method comprises adding 1,3-propanediol and KCl in a ratio effective for the 1,3-propanediol to substantially reduce the bitterness provided by the KCl in the food or beverage product. In one aspect, the method comprises adding 1,3-propanediol and KCl in a ratio of 1,3-propanediol to KCl of about 0.000025:1 to about 1:1, in another aspect about 0.00025:1 to about 0.5:1, and in another aspect about 0.025:1 to about 0.1:1.

The food or beverages including 1,3-propanediol and KCl may be prepared in a conventional manner, such as by mixing 1,3-propanediol and KCl with the remaining ingredients of the food or beverage product. It is not believed to be necessary that 1,3-propanediol be mixed with the KCl prior to addition to food or beverage products. Instead, the 1,3-propanediol and KCl can be added to the food or beverage products in any desired order.

A variety of food and beverage products can be prepared using 1,3-propanediol to reducing bitterness provided by KCl. For example, 1,3-propanediol and KCl may be used in products, such as, but not limited to, luncheon meat, cheese sauce, cheese, crackers, and sports beverages. It should be appreciated that this is simply an exemplary listing of food and beverages and that 1,3-propanediol and KCl may be used in a variety of other food and beverage products.

In some aspects, the food or beverage may include an additional salt substitute. The food or beverage may also include sodium chloride in a desired amount. In some aspects, it may be desired to use a combination of KCl and NaCl to provide a desired saltiness to the food product while still providing an overall reduced sodium content to the product.

By one approach, 1,3-propanediol may be used in beverage concentrates that are diluted to prepare a final beverage. As used herein, the term "concentrate" means a liquid or powdered composition that can be diluted with an aqueous, potable liquid to prepare a beverage. Concentrates can also be added to various food products to add flavor to the food product. 1,3-propanediol may also be included in ready-to-drink beverages. Suitable beverages include, but are not limited to, coffee, tea, milk, fruit juice (e.g., apple, grape, and orange juice), vegetable juice, carbonated beverage, cola, energy drink, sports drink, and the like.

In one form, the beverage or food concentrate in which 1,3-propanediol is included may be formulated to be diluted by a factor of at least 5 times to provide a final beverage or food product in consumable form, which can be, for example, an 8 ounce beverage. By some approaches, the concentrate can be provided at a concentration of about 5 to about 500 times, in another aspect about 25 to about 225 times, in another aspect about 50 to about 200 times, in another aspect about 75 to about 160 times, and in yet another aspect about 90 to about 140 times that needed to provide a desired level of flavor intensity, acidity, and/or sweetness to a final beverage, which can be, for example, an 8 ounce beverage. The term "final beverage" or "final product" as used herein means a beverage or food product that has been prepared by diluting the concentrate to provide a beverage or food product in a potable or consumable form. In some aspects, the concentrate may be non-potable due to acidulant content and/or flavor intensity. By way of example to clarify the term "concentration," a concentration of 75 times (i.e., "75x") would be equivalent to 1 part concentrate to 74 parts water (or other potable liquid) to provide the final beverage. In other words, the flavor profile of the final beverage is taken into account when determining an appropriate level of dilution, and thus concentration, of the liquid beverage concentrate. The dilution factor of the concentrate can also be expressed as the amount necessary to provide a single serving of concentrate.

Advantages and embodiments of the food and beverage products containing 1,3-propanediol described herein are further illustrated by the following examples; however, the particular conditions, processing steps, materials, and amounts thereof recited in these examples, as well as other conditions and details, should not be construed to unduly limit the described methods and compositions. All percentages are by weight unless otherwise indicated.

EXAMPLES

Examples were prepared using 1,3-propanediol to analyze the impact of 1,3-propanediol on suppressing bitterness in various food and beverage systems.

Example 1

Beverage samples were prepared to evaluate the effect of the level of 1,3-propanediol on *Stevia*. The beverages were prepared just prior to testing using water and the ingredients according to Table 1 below.

Four pairs of beverages were evaluated by consumers in one sitting. The order of evaluating the pairs of products was blocked so that the highest level of 1,3-propanediol (sample 4) was always served as the first pair of beverages along with its corresponding control. The order of evaluating the beverage samples within pairs was rotated. There was a timed five minute break between pairs. Water and unsalted crackers were used as a palate cleanser before tasting each beverage and between beverage pairs. The beverages were prepared at the facility prior to the onset of test using water along with the designated solutions.

The *stevia* used was SG95 from PureCircle. SG95 is a high purity combination (>95% steviol glycosides) of nine steviol glycosides. Reb A accounts for over half of the composition but also includes Rebaudioside D and Rebaudioside F. SG95 is 230 times sweeter than sugar.

| Pairs | |
|---|---|
| | Products for First Round of Testing |
| 1 | Beverage with 0.05% Stevia SG95 (control) |
| | Beverage with 0.05% Stevia SG95 + 0.0019% 1,3-Propanediol |
| 2 | Beverage with 0.05% Stevia SG95 (control) |
| | Beverage with 0.05% Stevia SG95 + 0.0075% 1,3-Propanediol |
| 3 | Beverage with 0.05% Stevia SG95 (control) |
| | Beverage with 0.05% Stevia SG95 + 0.015% 1,3-Propanediol |
| 4 | Beverage with 0.05% Stevia SG95 (control) |
| | Beverage with 0.05% Stevia SG95 + 0.3% 1,3-Propanediol |
| | Products for Second Round of Testing |
| 1 | Beverage with 0.05% Stevia SG95 (control) |
| | Beverage with 0.05% Stevia SG95 + 0.0000005% 1,3-Propanediol |
| 2 | Beverage with 0.05% Stevia SG95 (control) |
| | Beverage with 0.05% Stevia SG95 + 0.000005% 1,3-Propanediol |
| 3 | Beverage with 0.05% Stevia SG95 (control) |
| | Beverage with 0.05% Stevia SG95 + 0.00005% 1,3-Propanediol |
| 4 | Beverage with 0.05% Stevia SG95 (control) |
| | Beverage with 0.05% Stevia SG95 + 0.0005% 1,3-Propanediol |

The samples were tasted by consumers between 21-55 years of age who consume diet beverages at least once per month and are non-rejectors of flavored beverages. The consumers had no allergies or sensitivities to beverages or sweeteners, including artificial sweeteners.

Figure 1A:
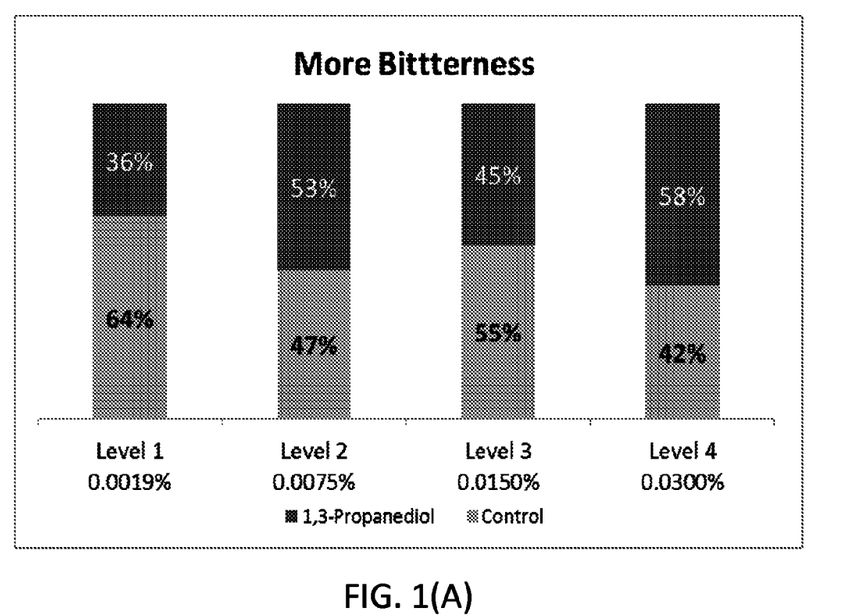
FIGS. 1(A) and (B) includes charts showing perception of bitterness and sweetness at various concentrations of 1,3-propanediol with *Stevia*.
Figure 1B:
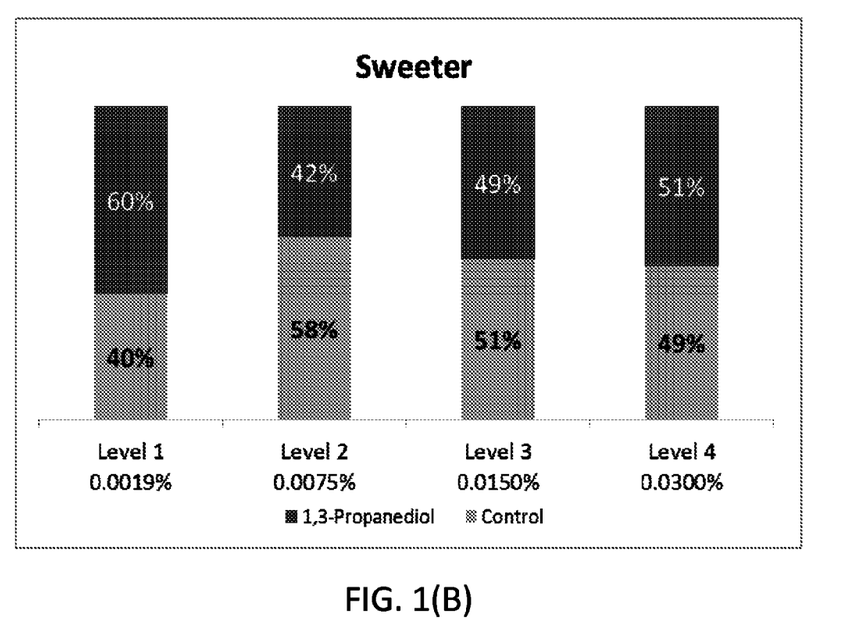

The results from the first round of testing are shown in FIGS. 1(A) and (B). In the first round of testing, it was found that inclusion of 1,3-propanediol in Pair 1 (0.0019 percent) demonstrated significantly less Stevia bitterness as compared to the Pair 1 control (no 1,3-propanediol). Neither the control nor the experimental sample of Pair 1 demonstrated significantly "more mouth drying," "longer lasting aftertaste," and "sweetness."

The experimental sample from Pair 2 (0.0075 percent 1,3-propanediol) demonstrated significantly more "mouth drying" as compared to the Pair 2 control. On all other attributes, the Pair 2 control and experimental samples were selected about equally.

There were no statistical differences in attributes for higher levels of 1,3-propanediol (0.0150 percent and 0.03 percent 1,3-propanediol in Pairs 3 and 4, respectively) versus control. However, the level of 1,3-propanediol in Pair 4 was associated with numerically more bitterness.

Figure 2A:
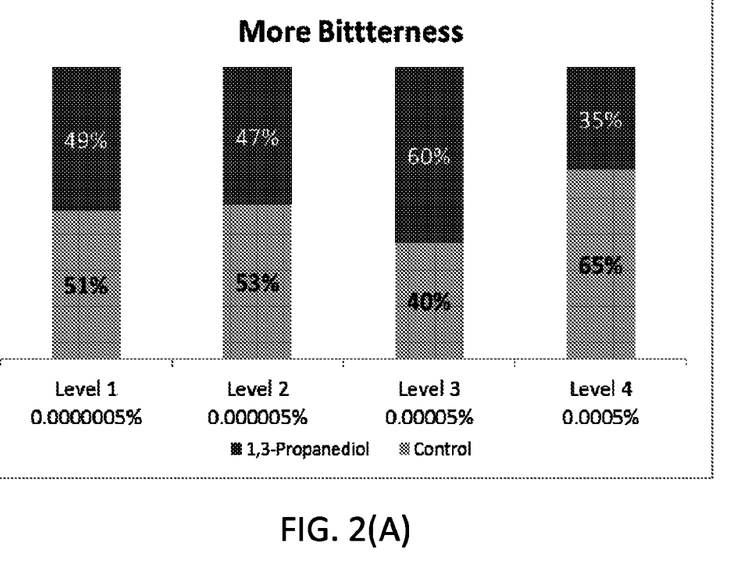
FIGS. 2(A) and (B) includes charts showing perception of bitterness and sweetness at various concentrations of 1,3-propanediol with *Stevia*.
Figure 2B:
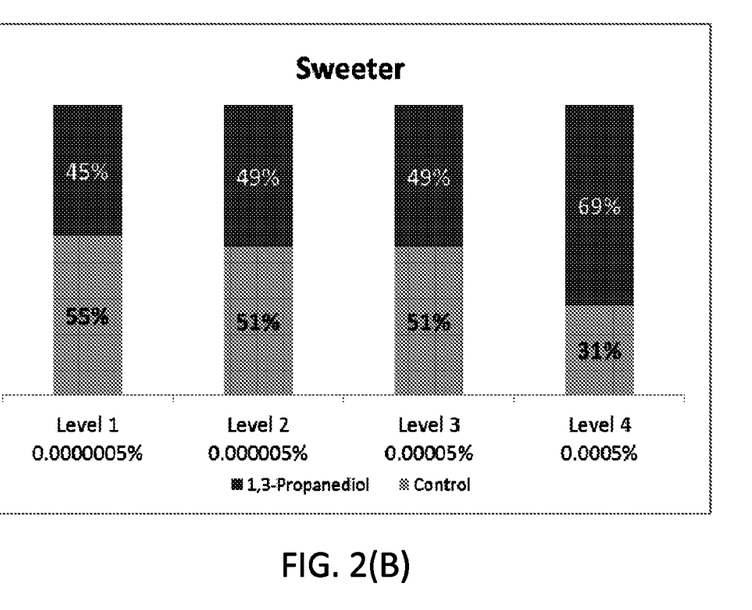
Figure 3:
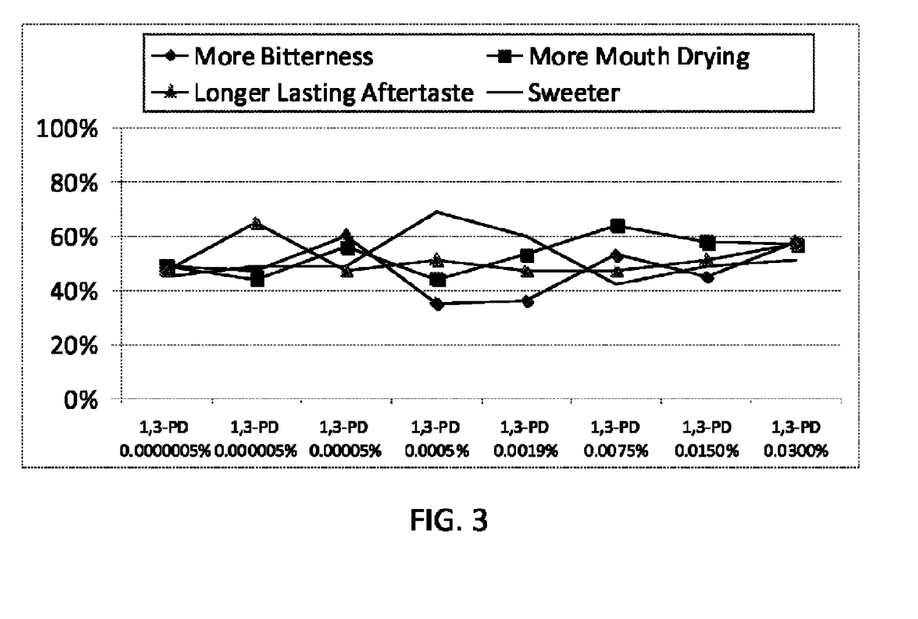
FIG. 3 includes a chart showing flavor perception at various concentrations of 1,3-propanediol with *Stevia*.

The results are shown in FIGS. 2(A) and (B) for the second round of testing. In the second round of testing, only the experimental sample of Pair 4 (0.0005 percent 1,3-propanediol) demonstrated significantly less bitterness and more sweetness compared to control.

The experimental sample from Pair 2 (0.000005 percent 1,3-propanediol) demonstrated significantly longer lasting aftertaste as compared to the control. On all other attributes, both samples from Pair 2 were selected about equally.

There were no statistical differences in attributes for the experimental samples of Pairs 1 and 3 (0.0000005 percent and 0.00005 percent 1,3-propanediol, respectively) versus their respective controls.

Only the 0.0005 percent 1,3-propanediol (Pair 4) sample was perceived as significantly sweeter versus control in the second round of tasting. While the 0.0019 percent 1,3-propanediol (Pair 1) sample in the first round of tasting fell short on being sweeter than control, it is believed that just a very slightly lower 1,3-propanediol level may have produced a significant difference.

Accordingly, the effective range of 1,3-propanediol for impacting bitterness was about 0.0005 percent and 0.0019 percent by weight of the beverage. It was also found that about 0.0005 percent and 0.0019 percent 1,3-propanediol was effective to increase the sweetness of the beverage.

Example 2

A 0.25% KCl in water solution was prepared and test samples were dosed with the appropriate amount of 1,3-propanediol according to Table 2 below. One ounce samples of each solution were prepared. The tasters received a pair (one blank and one dosed sample) and asked to rate which sample was more bitter. The scores in Table 2 are the number of tasters that chose that sample as being more bitter.

TABLE 2

| 1,3-Propanediol | Control | 1,3-Propanediol | % of tasters that chose the control as more bittter |
|---|---|---|---|
| 0.000005 ppm | 5 | 3 | 63% |
| 0.00005 ppm | 5 | 3 | 63% |
| 0.0005 ppm | 8 | | 100% |
| 0.005 ppm | 4 | 4 | 50% |
| 0.05 ppm | 6 | 2 | 75% |

TABLE 2-continued

| 1,3-Propanediol | Control | 1,3-Propanediol | % of tasters that chose the control as more bittter |
|---|---|---|---|
| 0.5 ppm | 5 | 3 | 63% |
| 5 ppm | 5 | 3 | 63% |
| 50 ppm | 6 | 2 | 75% |
| 100 ppm | 6 | 2 | 75% |
| 500 ppm | 6 | 2 | 75% |
| 5000 ppm | 1 | 7 | 13% |

The 5000 ppm sample was too high and the bitterness of the 1,3-propanediol was apparent. It was believed that at 5000 ppm, the tasters were tasting the 1,3-propanediol and it as no longer acting as a flavor adjuvant.

Example 3

Beverage samples were prepared to evaluate the effect of the level of 1,3-propanediol on KCl. The samples were tasted by consumers between 21-55 years of age with no allergies or sensitivities to food or beverages or ingredients.

On day 1 of testing, consumers were given two samples, one a 0.25% KCl solution and the other water, and asked "Which beverage is more bitter?" This was replicated a total of three times to obtain four different trials. Order within the pair was rotated. Those who selected the KCl sample at least three times across the four trials were classified as "KCl sensitive." Consumers then evaluated three more pairs of samples with varying levels of 1,3-propanediol with KCl versus a standard control (no 1,3-propanediol) as outlined in Table 3 below.

After the first day of testing, it was determined the number of KCl Bitterness Sensitive consumers may have been overstated. It was hypothesized that respondents could detect differences between plain water and water containing KCl, such as saltiness, but may not have been perceiving bitterness. Therefore, a second bitterness sensitivity test was conducted on day 2 using three pairs of a KCl solution (0.25%) versus a NaCl solution (0.15%) in an attempt to have the solutions iso-salty. Two new levels of Zemea were evaluated along with KCl versus a standard control as outlined in Table 3 below.

The order of evaluating the beverage samples within pairs were rotated (left/right). The order of evaluating the pairs of products was blocked so the highest level of 1,3-propanediol was always served as the first pair of beverages along with its control. There was a timed 5 minute break between pairs. Water and unsalted crackers were used as a palate cleanser before tasting each beverage and between beverage pairs.

TABLE 3

| Pairs | |
|---|---|
| | Products for First Day of Testing |
| 1 | Beverage with 0.25% KCl (control) |
| | Beverage with 0.25% KCl + 0.5% 1,3-Propanediol |
| 2 | Beverage with 0.25% KCl (control) |
| | Beverage with 0.25% KCl + 0.01% 1,3-Propanediol |
| 3 | Beverage with 0.25% KCl (control) |
| | Beverage with 0.25% KCl + 0.0005% 1,3-Propanediol |
| | Products for Second Day of Testing |
| 1 | Beverage with 0.25% KCl (control) |
| | Beverage with 0.25% KCl + 0.002% 1,3-Propanediol |
| 2 | Beverage with 0.25% KCl (control) |
| | Beverage with 0.25% KCl + 0.0001% 1,3-Propanediol |

Adding NaCl to the KCl/water solution decreased the number of "KCl sensitive" consumers by about 14% (from 67% on day 1 to 53% on day 2) but not to the expected level of 20-40%.

Figure 4:
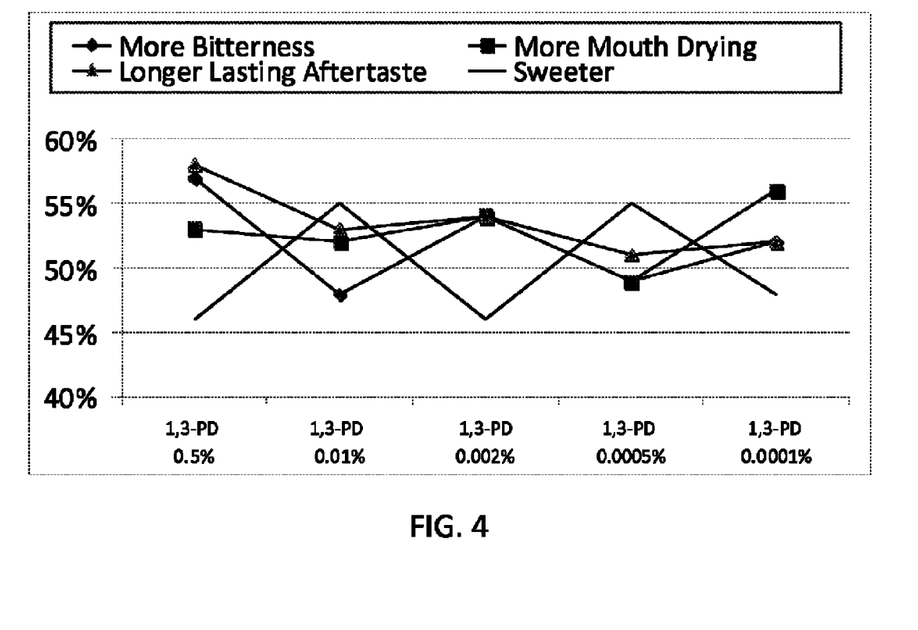
FIGS. 4-6 include charts showing flavor perception at various concentrations of 1,3-propanediol with KCl.

It was surprisingly found that, while KCl is not associated with sweetness, the consumers (general population) found that inclusion of 1,3-propanediol at about 0.0005% was associated with reduced bitterness but also increased sweetness (FIG. 4).

Figure 5:
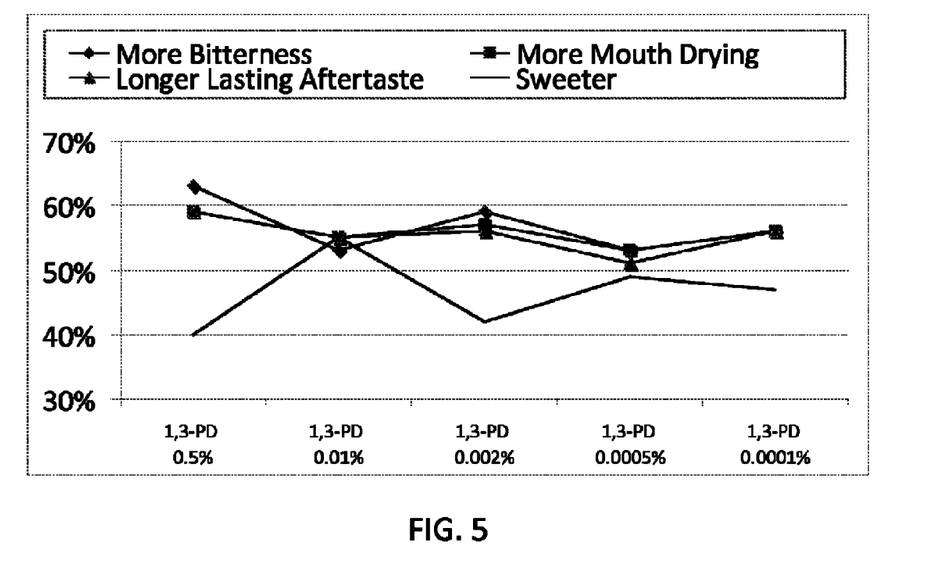
Figure 6:
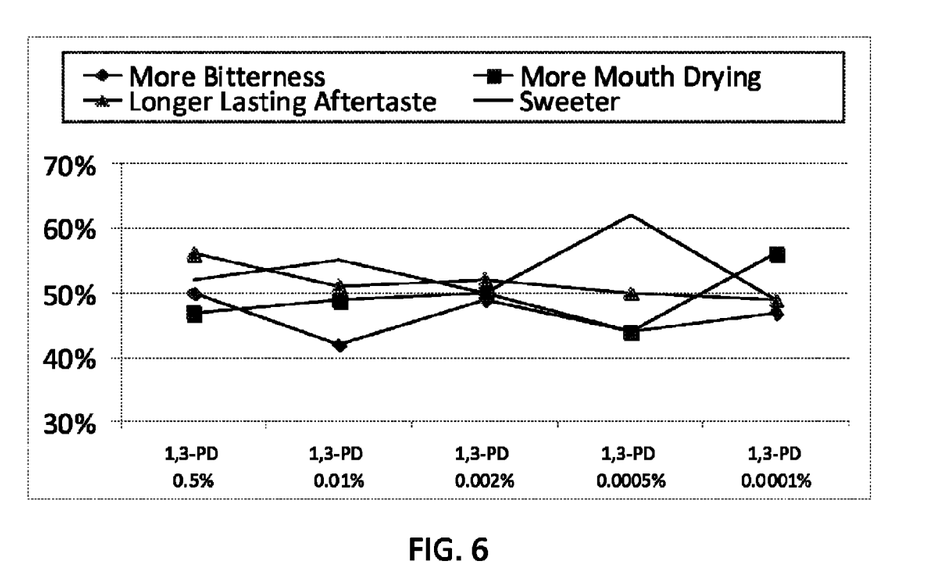

This was also found in the KCl sensitive consumers (FIG. 5), although to a less dramatic extent, and in non-KCl sensitive consumers (FIG. 6). The only statistically significant increase in sweetness was at 0.0005 percent 1,3-propanediol for non-KCl sensitive consumers.

Example 4

Samples A-D were prepared according to Table 4 below to analyze and determine if 1,3-propanediol imparted any flavor when used at low concentrations. The samples were evaluated by a team of four tasters.

TABLE 4

|  | Sample A | Sample B | Sample C | Sample D |
|---|---|---|---|---|
| Water | 100% | 99.86% | 90.0% | 89.86% |
| 1,3-propanediol | — | 0.14% | — | 0.14% |
| Sucrose | — | — | 10% | 10% |

Samples A and B were compared. Only one of the four tasters could identify the 1,3-propanediol in a triangle test. Samples C and D were also compared with only one taster identifying the 1,3-propanediol in a triangle test. This demonstrated that 1,3-propanediol is generally not detectable at low levels in water or sucrose sweetened beverages.

Example 5

Samples were prepared to analyze the effect of 1,3-propanediol with sweeteners such as Reb A. Samples G and H were prepared as shown in Table 5 below.

TABLE 5

| Ingredient | Sample G | Sample H |
|---|---|---|
| Water (ml) | 960 | 960 |
| Citric Acid (g) | 1.8 | 1.8 |
| Reb A (g) | 0.308 | 0.308 |
| 1,3-propanediol (g) | 0 | 0.8232 |

Nine panelists compared the samples. Panelists rinsed prior to tasting the samples and in between sample assessment with seltzer, unsalted crackers and water with a one-minute break between samples. Samples were assessed on the second sip. The results are shown below in Table 6 with the comments indicating the order of what was tasted in each of the samples (Scale: 0-15=None to Extreme).

TABLE 6

| Samples | Sweetness Mean | Sweetness Range | Comments |
|---|---|---|---|
| H | 5.8 | 4.5-7 | Astringent/drying/tingling/ Very sour/cooling/bitter/flat Soda/strong glue-y taste Licorice aftertaste |

TABLE 6-continued

| Samples | Sweetness Mean | Sweetness Range | Comments |
|---|---|---|---|
| G | 5.2 | 3.5-6.5 | Very bitter/burning/numbing/ Astringent/lingering/sour/ Lemon-lime note |

The use of 1,3-propanediol with Reb A illustrates a general shift in bitter and sour flavor profiles.

Example 6

Samples were prepared to compare the bitterness perception using 1,3-propanediol with potassium chloride. The samples were prepared according to Table 7 below.

TABLE 7

| Ingredient | Sample I | Sample J | Sample K |
|---|---|---|---|
| Water (ml) | 99.4% | 99.7% | 99.4% |
| KCl | 0.3% | 0.3% | 0.3% |
| 1,3-propanediol (g) | 0.3% | — | — |
| Propylene glycol | — | — | 0.3% |

A panel of five tasters compared the samples.

Taster 1 indicated that Samples J and K had the highest bitterness with Sample K being plasticy and gave a mouth coating. Further, Sample J had a pencil shaving type taste.

Taster 2 indicated that Sample I was the least bitter with Samples J and K having a pencil shaving type taste.

Taster 3 indicated that Sample I had the least bitterness while Sample K was very bitter with an off flavor.

Taster 4 indicated that Sample I was somewhat bitter with Sample J having a much more bitter flavor. Sample K had a muted salty taste that was also plasticy.

Taster 5 indicated that there was some bitter flavor in Sample I with a more intense bitter taste in Sample J. Further, Sample K had a lingering bitter taste.

Based on the above tasters, it is believed that 1,3-propanediol functioned to suppress bitterness when used with potassium chloride.

Example 7

Samples were prepared to evaluate the effect of inclusion of 1,3-propanediol with acetic acid. Sample M included 0.05 percent acetic acid in water, Sample N included 0.05 percent acetic acid in water with 0.3 percent 1,3-propanediol, and Sample O included 0.05 percent acetic acid in water with 0.3 percent propylene glycol. The samples were evaluated by a team of three tasters.

Each of the three testers indicated that Sample O was the least sour, Sample N was more sour than Sample O, and Sample M was the most sour. Therefore, it is believed that 1,3-propanediol increases the sourness compared to water when combined with acetic acid.

Example 8

Samples were prepared to evaluate the effect of inclusion of 1,3-propanediol with citric acid. Sample S included 0.1 weight percent citric acid and 0.3 weight percent 1,3-propanediol in water. Sample T included 0.1 weight percent citric acid and 0.3 weight percent propylene glycol in water. Sample U included 0.1 weight percent citric acid in water. The samples were then evaluated by a team of three tasters.

The three tasters listed the samples in order of decreasing sourness:
Taster 1—U/S/T
Taster 2—T/U/S
Taster 3—T/U/S Example 9

Samples were prepared to evaluate the effect of including 1,3-propanediol with a higher concentration of citric acid than in Example 8. Sample V included 1 weight percent citric acid and 0.3 weight percent propylene glycol in water. Sample W included 1 weight percent citric acid in water. Sample X included 1 weight percent citric acid in water with 0.3 weight percent 1,3-propanediol. The samples were then evaluated by a team of four tasters.

Taster 1 indicated that Sample W was the most mild tasting and Sample X was less sour than Sample V.

Taster 2 indicated that Sample V and Sample X were similar with Sample W being milder.

Taster 3 indicated that Sample W was less sour than Samples V and X.

Taster 4 indicated that Sample W was the most mellow with Sample V being slightly less sour than Sample X.

Therefore, it is believed that 1,3-propanediol increased sourness perception when combined with citric acid.

Example 10

Samples were prepared to evaluate the effect of including 1,3-propanediol with malic acid. Sample Y included 1 weight percent malic acid with 0.3 weight percent 1,3-propanediol in water. Sample Z included 1 weight percent malic acid and 0.3 weight percent propylene glycol in water. Sample AA included 1 weight percent malic acid in water.

Taster 1 indicated that Sample Y was less sour than the other samples.

Taster 2 indicated that Sample Y had an initial sourness, but Samples Z and AA were more sour overall.

Taster 3 indicated that Sample Y was less sour than the other samples.

Taster 4 indicated that Sample Y had the most upfront sourness while Samples Z and AA were lingering.

Therefore, it was found that malic acid was more sour upfront but less lingering when included in combination with 1,3-propanediol. It is further found that, 1,3-propanediol may modify the acid perception, such as intensity and/or timing, in the flavor profile relative to a similar food or beverage which does not contain 1,3-propanediol.

Example 11

Samples were prepared to evaluate the effect of including 1,3-propanediol with tea. Six earl grey tea bags were combined with 250 ml of water for 30 minutes. Sample AB included 0.3 weight percent 1,3-propanediol in the steeped tea and Sample AD included 0.3 weight percent propylene glycol in the steeped tea. Sample AC was a tea only control. The samples were evaluated by a team of four tasters.

Taster 1 indicated that Sample AB had the least intense flavor, was the least bitter and was the least sour. Sample AC was the most sour and astringent.

Taster 2 indicated that Sample AB was the most sour, least bitter, and most astringent. Sample AD was more bitter, less astringent and less sour than Sample AB. In Sample AC, bitter dominated.

Taster 3 indicated that Sample AB was very astringent, the least bitter, and the least sour. Sample AC was bitter and astringent with no sour flavor. Sample AD had a strong bitter flavor, was in the middle for astringent and the most sour.

Taster 4 indicated that Sample AB was floral, bitter with a mild astringency. Sample AC was more astringent and sour. Sample AD was more astringent and bitter.

Therefore, it is believed that when tea is combined with 1,3-propanediol, the flavor profile improved the base with sour, bitter, and astringent characteristics all changed.

Example 12

Samples were prepared to evaluate the effect of including 1,3-propanediol with coffee. Robusta instant coffee was prepared with 1 weight percent coffee in water. Sample AE included 0.3 weight percent propylene glycol in the prepared coffee. Sample AF was a coffee only control. Sample AG included 0.3 weight percent 1,3-propanediol in the prepared coffee.

Taster 1 indicated that Sample AE was less sour with Sample AF was in the middle for sour and more bitter. Sample AG was the most metallic.

Taster 2 indicated that all samples were bitter with Sample AF being the least bitter and Sample AF the most bitter.

Taster 3 indicated that Sample AE was sour and bitter while Sample AF was more coffee like with some astringency. Sample AG was less sour and less bitter.

Taster 4 indicated that Sample AE was sour, astringent and ashy. Sample AF was more roasted and slightly more bitter but less sour. Sample AG was ashy, sour and less bitter.

Therefore, it is believed that when coffee is combined with 1,3-propanediol, the flavor profile is less bitter than without 1,3-propanediol.

Example 13

Samples were prepared to evaluate the effect of including 1,3-propanediol with orange juice. An orange juice only control was compared to Sample AJ that included 0.3 weight percent 1,3-propanediol in the orange juice. All three tasters indicated Sample AJ was less bitter, sweeter and rounded at the end.

The foregoing descriptions are not intended to represent the only forms of the food and beverage products containing 1,3-propanediol and methods of suppressing bitterness or enhancing sweetness in food and beverage products. The percentages provided herein are by weight unless stated otherwise. Changes in form and in proportion of parts, as well as the substitution of equivalents, are contemplated as circumstances may suggest or render expedient. Similarly, while food or beverages and methods have been described herein in conjunction with specific embodiments, many alternatives, modifications, and variations will be apparent to those skilled in the art in light of the foregoing description.

What is claimed is:
1. A method for reducing bitterness in a beverage product comprising a high intensity sweetener, the method comprising preparing a beverage product comprising 1,3-propanediol in an amount effective to provide a ratio of 1,3-propanediol to the high intensity sweetener in the beverage product of about 0.01:8 to about 0.6:8, wherein the high intensity sweetener in the ratio with the 1,3-propanediol comprises one or more steviol glycosides selected from the group consisting of rebaudioside A, rebaudioside B, rebaudioside C, rebaudio- side D, rebaudioside E, rebaudioside F, dulcoside A, dulcoside B, rubusoside, stevioside, and steviolbioside, and combinations thereof.

2. The method according to claim 1, wherein 1,3-propanediol is included in an amount effective to provide a ratio of 1,3-propanediol to high intensity sweetener of about 0.1:5 to about 0.6:5.

3. The method according to claim 1, wherein 1,3-propanediol is included in an amount effective to provide a ratio of 1,3-propanediol to high intensity sweetener of about 1:5 to about 2:5.

4. The method according to claim 1, wherein the beverage product is selected from the group consisting of beverage, powdered beverage, and beverage concentrate.

5. The method according to claim 4, wherein the beverage product is a beverage concentrate.

6. The method according to claim 1, wherein 1,3-propanediol is included in an amount of about 0.0001 to about 0.006 percent by weight of the beverage product.

7. The method according to claim 1, wherein 1,3-propanediol is included in an amount of about 0.0005 to about 0.0019 percent by weight of the beverage product.

8. A beverage product comprising 1,3-propanediol and at least one high intensity sweetener, the 1,3-propanediol included in an amount of about 0.0001 to about 0.006 percent by weight of the beverage product, and the 1,3-propanediol and the high intensity sweetener included in amounts to provide a ratio of 1,3-propanediol to the high intensity sweetener of about 0.01:8 to about 0.6:8 in the beverage product, wherein the high intensity sweetener in the ratio with the 1,3-propanediol comprises one or more steviol glycosides selected from the group consisting of rebaudioside A, rebaudioside B, rebaudioside C, rebaudioside D, rebaudioside E, rebaudioside F, dulcoside A, dulcoside B, rubusoside, stevioside, and steviolbioside, and combinations thereof.

9. The beverage product according to claim 8, wherein 1,3-propanediol is included in an amount of about 0.0001 to about 0.0019 percent by weight of the beverage product.

10. The beverage product according to claim 8, wherein 1,3-propanediol is included in an amount of about 0.0005 to about 0.0019 percent by weight of the beverage product.

11. The beverage product according to claim 8, wherein the beverage product is selected from the group consisting of beverage, powdered beverage, and beverage concentrate.

12. The beverage product according to claim 8, wherein about 0.001 to about 0.07 percent high intensity sweetener is included.

13. A beverage product made according to the method of claim 1.

* * * * *